Dec. 14, 1954
E. D. WILKIN
2,696,741
CLUTCH STRUCTURE
Filed Dec. 17, 1951
2 Sheets-Sheet 1
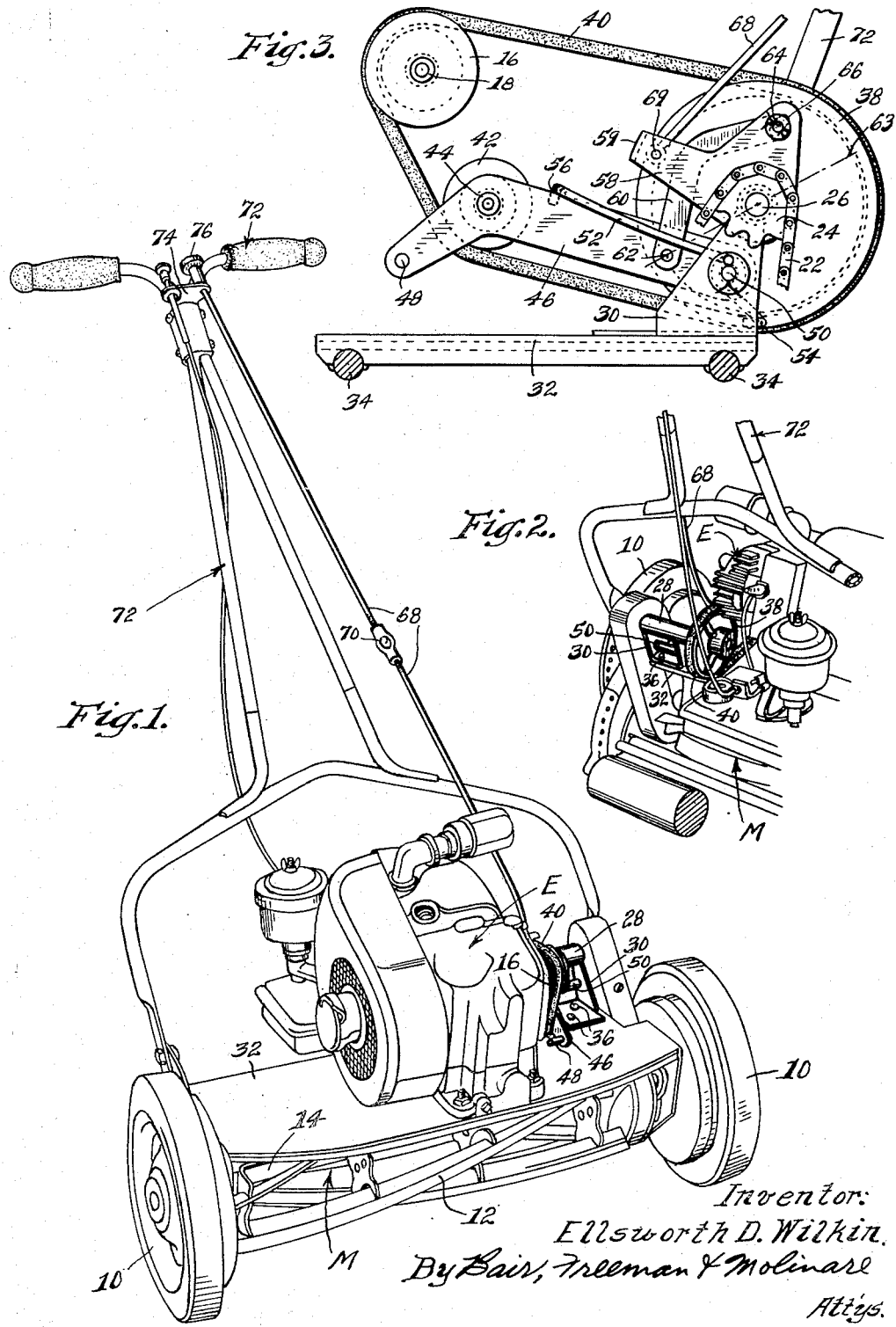
Inventor:
Ellsworth D. Wilkin,
By Bair, Freeman & Molinare
Attys.

Dec. 14, 1954

E. D. WILKIN 2,696,741

CLUTCH STRUCTURE

Filed Dec. 17, 1951

Inventor.
Ellsworth D. Wilkin.
By Bair, Freeman & Molinare
Attys.

United States Patent Office 2,696,741
Patented Dec. 14, 1954

2,696,741

CLUTCH STRUCTURE

Ellsworth D. Wilkin, Ottumwa, Iowa, assignor to Johnston Lawn Mower Corporation, Ottumwa, Iowa, a corporation of Iowa Application December 17, 1951, Serial No. 262,131

5 Claims. (Cl. 74—242.1)

This invention relates to a clutch stucture, particularly designed for power mowers, the structure being formed of few parts and comparatively simple to manufacture and operate.

One object of the invention is to provide a clutch structure adapted to be interposed between the engine and the reel of a lawn mower or the like with suitable driving connections for reducing the speed of the engine to a suitable speed for the reel and including a belt around a pair of pulleys together with a clutch lever carrying a clutch roller for tightening and loosening the belt, thus driving the reel from the engine or stopping the reel as desired.

Another object is to provide a clutch structure in the form of a bracket on which a drive shaft is rotatably mounted, the bracket carrying a clutch lever, a clutch operating arm and a link connected between them together with other parts necessary for forming the clutch structure so that the entire structure and the bracket are a unit which can be connected to the platform of a power mower.

Still another object is to provide a cutch lever pivotally mounted on the bracket and having a spring to move the lever in a direction for the clutch roller thereof to engage the belt and tighten it, the clutch operating arm being pivotally mounted about a bearing sleeve on the bracket for the drive shaft and being operatively connected to the clutch lever by a link connection that can move to an overcenter locked position for holding the clutch roller away from the belt in the inoperative position of the clutch.

A further object is to provide a belt engaging element on the clutch lever for engaging the belt and lifting it against the force of gravity to a position where it clears the engine pulley to avoid undue rubbing of the pulley against the belt in the inoperative position of the clutch.

Still a further object is to provide a clutch structure in which the clutch operating arm may be readily controlled by a rod extending up to the handle of the mower.

With these and other objects in view, my invention consists in the construction, arrangement and combination of the various parts of my device, whereby the objects contemplated are attained, as hereinafter more fully set forth, pointed out in my claims and illustrated in the accompanying drawings, wherein:

Figure 1 is a perspective view of a power lawn mower showing the clutch structure embodying my present invention applied thereto.

Figure 2 is a partial rear view of the mower showing further details of the clutch structure.

Figure 3 is an enlarged vertical sectional view showing particularly the clutch structure and illustrating it in the operative position.

Figure 6 is a rear view of the clutch structure and associated portions of the power mower, the line 3—3 being the section line on which Figure 3 is illustrated.

Figure 4:
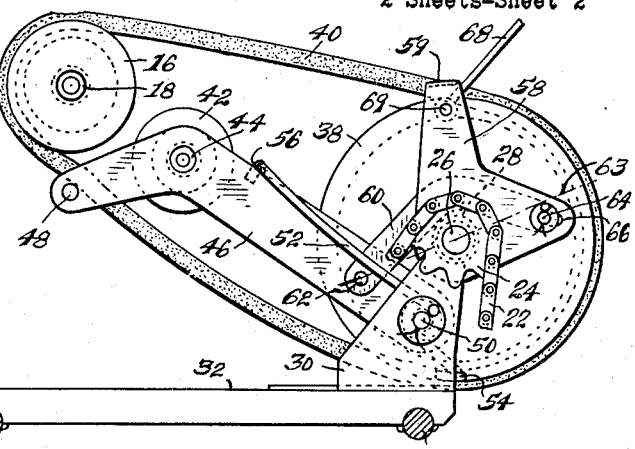
Figure 4 is a similar sectional view showing the clutch structure in the inoperative position.
Figure 6:
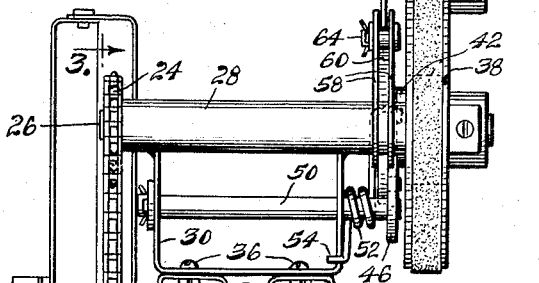

On the accompanying drawings I have used the reference character M to indicate in general a mower of the power type. At 10 traction wheels are shown for supporting a suitable frame and a platform 32. The mower reel is illustrated at 12 and is mounted on a reel shaft 14.

The engine of the mower for operating the reel shaft is shown in general at E and includes an engine pulley 16 on the shaft 18 of the engine. The traction wheels 10 may or may not be driven from the reel shaft 14, but this feature of the power mower forms no part of my present invention. Instead the present invention has to do with a clutch structure for driving the reel shaft 14 as through a sprocket 20 mounted thereon, a chain 22 meshed with the sprocket, and a second sprocket 24 on a drive shaft 26 of the clutch structure.

The drive shaft 26 is rotatably mounted in a drive shaft bearing sleeve 28 which is secured as by welding to a U-shaped bearing sleeve bracket 30. The bracket 30 is secured to the platform 32 as by bolts 36, the platform in turn being secured as by welding to frame rods 34 of the mower frame. A drive shaft pulley 38 is mounted on the drive shaft 26 and is operatively connected by a belt 40 to the engine pulley 16.

My clutch structure includes a clutch roller 42 for co-action with the inner surface of the belt 40 and it is rotatably mounted on a stud 44 of a clutch lever 46. The clutch lever 46 has its inner end connected to a clutch lever pivot rod which is rockably mounted in openings of the flanges of the U-shaped bearing sleeve bracket 30 and carries a belt engaging pin 48 near its outer end. A spring 52 is coiled around the pivot rod 50 and has an anchored end 54 engaging the bracket 30 and a clutch lever end 56 engaging the clutch lever for the purpose of biasing the clutch lever counterclockwise in Figures 3 and 4 to resiliently engage the clutch roller 42 with the belt 40.

Figure 5:
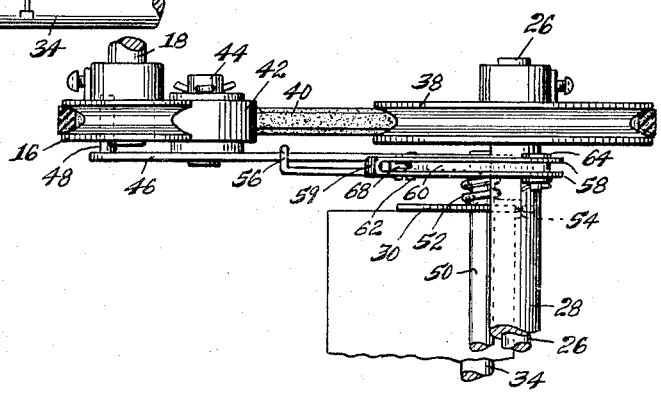
Figure 5 is a plan view of Figure 4.

A clutch operating arm 58 is provided which arm is of bell crank shape and may be stamped from sheet metal with duplicate sides, being rebent at 59 as shown in Figure 5 so that in plan view it is U-shaped. A link 60 is mounted between the sides of the clutch operating arm and carries a stud 62 engaged in an opening of the lever 46 for pivotally connecting the link to the lever, a pin 64 being provided in the other end of the link passing through slots 66 of the clutch operating arm 58.

A clutch operating rod 68 is pivoted as at 69 to the clutch operating arm 58 and is made adjustable as by a turnbuckle 70 (see Fig. 1). The handle of the mower shown generally at 72 is provided with a handle bracket 74 perforated for the clutch operating rod 68 to extend slidably through and on its upper end a clutch operating knob 76 is provided.

Figures 3 and 4 show a center line 63 through the drive shaft 26 and the stud 62. The link 60 is overcenter relative to this center line in Figure 4 for a purpose which will hereinafter appear.

Practical operation

In the operation of my clutch structure, the parts are in the operating position when adjusted as in Figure 3 with the clutch operating rod 68 down and stopped in the position illustrated by the knob 76 in Figure 1 engaging the bracket 74. In this position it is desirable that the pin 64 be intermediate the ends of the slot 62 so that the spring 52 is operable to bias the clutch roller 42 in the belt tightening direction (downwardly). This adjustment may be secured by proper manipulation of the turnbuckle 70.

When it is desirable to shift the clutch to the inoperative position, the operator needs merely pull upwardly on the knob 76 until the pin 64 moves from the position of Figure 3 to just past the center line 63 whereupon the spring 52 will hold the clutch operating arm 58 locked in the inoperative position of Figure 4 with the parts stopped in that position by reason of the link 60 engaging the bearing sleeve 28 as shown by dotted lines. In this position, the clutch roller 42 is free of the belt 40 so that the belt is loose, and the belt engaging pin 48 has engaged the outside of the belt 40 to lift the belt against the force of gravity to the position shown in Figure 4 so that it is loosened with respect to the engine pulley 16 instead of frictionally dragging thereon due to the weight of the belt.

When it is desirable to again render the clutch structure operative, it is merely necessary to press downwardly slightly on the knob 76 until the pin 64 has passed the center line 63 and the spring 52 will thereupon return the belt tightener roller 42 to the operative position of Figure 3.

My disclosed clutch structure is comparatively simple to manufacture and to operate. It is also efficient and inexpensive so as to substantially reduce the over-all cost of a power mower. It is easily adjusted at the turnbuckle 70 to compensate for wear and to always insure resilient pressure of the roller 42 against the belt during the operation of the mower.

Some changes may be made in the construction and arrangement of the parts of my clutch structure without departing from the real spirit and purpose of my invention, and it is my intention to cover by my claims any modified forms of structure or use of mechanical equivalents which may be reasonably included within their scope.

I claim as my invention:

1. In a clutch structure, a drive shaft, a bracket for mounting said drive shaft for rotation, a driven pulley on said drive shaft, a power pulley spaced from said driven pulley and adapted to be rotated by a source of power, a belt for transmitting power from said power pulley to said driven pulley, and means for tightening and loosening said belt comprising a clutch lever pivotally mounted on said bracket, a clutch roller journaled thereon and adapted to engage the inner surface of said belt, spring means biasing said clutch lever to move in a direction for tightening said belt, a clutch operating arm pivotally mounted on said bracket, and a link connecting said clutch operating arm to said clutch lever, said link being pivotally connected to said clutch lever and said clutch operating arm to move said clutch lever against the bias of said spring to an over-center position relative to a line through the pivots of said clutch operating arm to said bracket and said link to said clutch lever, with said clutch roller free of said belt, said clutch lever having a belt engaging element to engage the outside of said belt and lift the belt against the bias of gravity to a position loose around the power pulley.

2. In a clutch structure of the character disclosed, a drive shaft, a bracket for mounting said drive shaft for rotation, a driven pulley on said drive shaft, a power pulley spaced from said driven pulley and adapted to be rotated by a source of power, a belt for transmitting power from said power pulley to said driven pulley, and means for tightening and loosening said belt comprising a clutch lever pivotally mounted on said bracket, a clutch rollers journaled thereon and adapted to engage said belt, spring means biasing said clutch lever to move in a direction for tightening said belt, a clutch operating arm pivotally mounted on said bracket, and a link connecting said clutch operating arm to said clutch lever.

3. In a clutch structure, a drive shaft, a bracket for mounting said drive shaft for rotation, a driven pulley on said drive shaft, a power pulley spaced from said driven pulley and adapted to be rotated by a source of power, a belt for transmitting power from said power pulley to said driven pulley, and means for tightening and loosening said belt comprising a clutch lever pivotally mounted on said bracket, a clutch roller journaled thereon and adapted to engage said belt, spring means biasing said clutch lever to move in a direction for tightening said belt, a clutch operating arm pivotally mounted on said bracket, and a link connecting said clutch operating arm to said clutch lever, said link being pivotally connected to said clutch lever and said clutch operating arm to move said clutch lever against the bias of said spring to an over-center position relative to a line through the pivots of said clutch operating arm to said bracket and said link to said clutch lever, with said clutch roller free of said belt.

4. In a clutch structure for power mowers, a drive shaft, a bracket for mounting said drive shaft, said bracket having a bearing sleeve in which said drive shaft is rotatable, a driven pulley on said drive shaft, a power pulley spaced from said driven pulley and adapted to be rotated by a source of power, a belt for transmitting power from said power pulley to said driven pulley, and means for tightening and loosening said belt comprising a clutch lever pivotally mounted on said bracket, a clutch roller journaled thereon and adapted to engage the inner surface of said belt, spring means biasing said clutch lever to move in a direction for tightening said belt, a clutch operating arm pivotally mounted on said bearing sleeve, and a link connecting said clutch operating arm to said clutch lever, said link being pivotally connected to said clutch lever and to said clutch operating arm.

5. In a clutch structure, a drive shaft, a bracket, means for mounting said drive shaft on said bracket for rotation, a driven pulley on said drive shaft, a power pulley spaced from said driven pulley and adapted to be rotated by a source of power, a belt for transmitting power from said power pulley to said driven pulley, and means for tightening and loosening said belt comprising a clutch lever pivotally mounted on said bracket, a clutch roller journaled thereon and adapted to engage said belt to tighten the same relative to said pulleys, spring means effecting pivotal movement of said clutch lever to such position, a clutch operating arm pivotally mounted on said bracket, and a link connecting said clutch operating arm to said clutch lever.

References Cited in the file of this patent

UNITED STATES PATENTS

| Number | Name | Date |
|---|---|---|
| 1,605,962 | Lovejoy | Nov. 9, 1926 |
| 1,650,668 | Travers | Nov. 29, 1927 |
| 2,366,159 | Thomas | Jan. 2, 1945 |
| 2,519,039 | George et al. | Aug. 15, 1950 |

FOREIGN PATENTS

| Number | Country | Date |
|---|---|---|
| 977,790 | France | Nov. 15, 1950 |